(12) United States Patent
Choi et al.

(10) Patent No.: US 6,757,537 B1
(45) Date of Patent: Jun. 29, 2004

(54) POWER CONTROL DEVICE AND METHOD FOR A MOBILE COMMUNICATION SYSTEM

(75) Inventors: Jin-Woo Choi, Kyonggi-do (KR); Jae-Min Ahn, Kyonggi-do (KR); Joong-Ho Jeong, Seoul (KR); Young-GKy Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 239 days.

(21) Appl. No.: 09/596,467

(22) Filed: Jun. 19, 2000

(30) Foreign Application Priority Data

Aug. 17, 1999 (KR) ........................................ 1999-22791

(51) Int. Cl.[7] .............................................. H04Q 7/20
(52) U.S. Cl. ........................ 455/438; 455/522; 455/561; 455/226.2; 455/226.3
(58) Field of Search ............................... 455/435, 436, 455/438, 561, 550, 522, 226.1, 226.2, 226.3, 67.1, 67.3, 517–519, 423, 442, 501, 435.1, 435.3, 67.11, 67.13; 370/320, 342, 335, 317

(56) References Cited

U.S. PATENT DOCUMENTS 5,903,844 A * 5/1999 Bruckert et al. ............ 455/456
6,141,565 A * 10/2000 Feuerstein et al. .......... 455/422
6,278,701 B1 * 8/2001 Ayyagari et al. ............ 370/310
6,385,437 B1 * 5/2002 Park et al. .................... 455/69
6,396,867 B1 * 5/2002 Tiedemann et al. ......... 370/342
6,434,367 B1 * 8/2002 Kumar et al. ................. 455/70

FOREIGN PATENT DOCUMENTS

WO        WO 00/10265        2/2000

OTHER PUBLICATIONS

Japanese Office Action dated Dec. 9, 2003 issued in a counterpart application, namely, Appln. No. 2001–504694.

* cited by examiner

Primary Examiner—Nay Maung
Assistant Examiner—Edan Orgad
(74) Attorney, Agent, or Firm—Dilworth & Barrese LLP

(57) ABSTRACT

A power control device and method in a mobile communication system. Upon receipt of a call request, a base station selects a call type corresponding to the call request. The base station includes a memory for storing power control parameter values for every call type serviceable in the mobile communication system. The base station reads a power control parameter value corresponding to the selected call type from the memory, and provides the read power control parameter value to the mobile station to perform outer loop power control.

18 Claims, 17 Drawing Sheets

| FIELD | LENGTH(BITS) |
|---|---|
| SERV_CON_SEQ | 3 |
| RESERVED | 5 |
| RECORD_TYPE | 8 |
| RECORD_LEN | 8 |
| TYPE-SPECIFIC FIELDS | 8 RECORD_LEN |
| RESTORE_IND_INCL | 1 |
| RESTORE_IND | 0 OR 1 |
| SCR_SEQ | 0 OR 4 |
| BLOB_INCL | 1 |
| BLOB | 0 OR 7 |

501 — TYPE-SPECIFIC FIELDS

FIG.5

| FIELD | LENGTH(BITS) |
|---|---|
| FOR_MUX_OPTION | 16 |
| REV_MUX_OPTION | 16 |
| FOR_RATES | 8 |
| REV_RATES | 8 |
| NUM_CON_REC | 8 |
| RECORD_LEN | 8 |
| CON_REF | 8 |
| SERVICE_OPTION | 16 |
| FOR_TRAFFIC | 4 |
| REV_TRAFFIC | 4 |
| GATING_RATE_INCL | 1 |
| PILOT_GATE_RATE | 0 OR 2 |
| FPC_MODE | 3 |
| 601 — FPC_OLPC_FCH_INCL | 1 |
| 602 — FPC_FCH_FER | 0 OR 5 |
| 603 — FPC_MIN_FCH_SETPT | 0 OR 8 |
| 604 — FPC_MAX_FCH_SETPT | 0 OR 8 |
| 605 — FPC_OLPC_DCCH_INCL | 1 |
| 606 — FPC_DCCH_FER | 0 OR 5 |
| 607 — FPC_MIN_DCCH_SETPT | 0 OR 8 |
| 608 — FPC_MAX_DCCH_SETPT | 0 OR 8 |
| FCH_CC_INCL | 1 |
| FCH_FRAME_SIZE | 0 OR 1 |
| FOR_FCH_RC | 0 OR 5 |
| REV_FCH_RC | 0 OR 5 |
| DCCH_CC_INCL | 1 |
| DCCH_FRAME_SIZE | 0 OR 2 |
| FOR_DCCH_RC | 0 OR 5 |
| REV_DCCH_RC | 0 OR 5 |
| FOR_SCH_CC_INCL | 1 |
| NUM_FOR_SCH | 0 OR 2 |
| FOR_SCH_ID | 2 |
| FOR_SCH_MUX | 16 |
| SCH_CC_TYPE-SPECIFIC FIELD | VARIABLE |
| FOR_MULTI_FRAME_OFFSET | 0 OR 2 |
| REV_SCH_CC_INCL | 1 |
| NUM_REV_SCH | 0 OR 2 |
| REV_SCH_ID | 2 |
| REV_SCH_MUX | 16 |
| SCH_CC_TYPE-SPECIFIC FIELD | VARIABLE |
| REV_MULTI_FRAME_OFFSET | 0 OR 2 |
| RPC_CHANNEL | 0 OR 1 |
| NUM_LPM_ENTRIES | 0 OR 4 |
| FORWARD_FLAG | 1 |
| REVERSE_FLAG | 1 |
| LOGICAL_CHANNEL | 4 |
| SR | 3 |
| PRIORITY | 4 |
| PH_RESOURCE_ID | 4 |
| RESERVED | 0-7 |

FIG.6

| | |
|---|---|
| NORM_FPC_FCH_FER_M_L | CALL_TYPE_INDEX |
| NORM_FPC_MIN_FCH_SETPT_M_L | ⋮ |
| NORM_FPC_MAX_FCH_SETPT_M_L | ⋮ |
| NORM_FPC_FCH_FER_M_M | |
| NORM_FPC_MIN_FCH_SETPT_M_M | |
| NORM_FPC_MAX_FCH_SETPT_M_M | |
| HIGH_FPC_FCH_FER_M_L | GENERAL PAGING MSG PARAMETER |
| HIGH_FPC_MIN_FCH_SETPT_M_L | |
| HIGH_FPC_MAX_FCH_SETPT_M_L | |
| HIGH_FPC_FCH_FER_M_M | |
| HIGH_FPC_MIN_FCH_SETPT_M_M | |
| HIGH_FPC_MAX_FCH_SETPT_M_M | |

FIG.13

| | |
|---|---|
| NORM_FPC_FCH_FER_M_L | CALL_TYPE_INDEX |
| NORM_FPC_MIN_FCH_SETPT_M_L | ⋮ |
| NORM_FPC_MAX_FCH_SETPT_M_L | ⋮ |
| NORM_FPC_FCH_FER_M_M | |
| NORM_FPC_MIN_FCH_SETPT_M_M | |
| NORM_FPC_MAX_FCH_SETPT_M_M | |
| HIGH_FPC_FCH_FER_M_L | GENERAL PAGING MSG PARAMETER |
| HIGH_FPC_MIN_FCH_SETPT_M_L | |
| HIGH_FPC_MAX_FCH_SETPT_M_L | |
| HIGH_FPC_FCH_FER_M_M | |
| HIGH_FPC_MIN_FCH_SETPT_M_M | |
| HIGH_FPC_MAX_FCH_SETPT_M_M | |

FIG.15

POWER CONTROL DEVICE AND METHOD FOR A MOBILE COMMUNICATION SYSTEM

PRIORITY

This application claims priority to an application entitled "Power Control Device and Method for Mobile Communication System" filed in the Korean Industrial Property Office on Jun. 17, 1999 and assigned Ser. No. 99-22791, the contents of which are hereby incorporated by reference.

BACKGROUND OF THE INVENTION

1. Field of the Invention

The present invention relates generally to a mobile communication system, and, in particular, to a power control device and method for improving the quality of calls between mobile stations in a CDMA (Code Division Multiple Access) mobile communication system.

2. Description of the Related Art

In a typical CDMA system, for a call between a mobile station and a telephone connected by wire to an existing wire telephone network, the mobile station exchanges a signal with a base station and the base station exchanges a signal with the existing wire telephone network. Since the base station is connected to the existing wire telephone network by wire, the error rate of the signals transmitted between the base station and the existing wire telephone network is very low. Therefore, the overall call quality between the mobile station and the existing wire telephone depends on the condition of the channel between the mobile station and the base station.

On the other hand, for a call between mobile stations, the signal is transmitted through three links: a first link between the first mobile station and a first base station, a second link between the first base station and a second base station, and a third link between the second base station and the second mobile station. In this case, unlike the call between the mobile station and the telephone on the existing wire telephone network, there are two call connections maintained between a mobile station and a base station, causing degradation of the overall call quality.

FIG. 1A shows how to connect a call between a mobile station and a wire telephone using a general power control method, and FIG. 1B shows how to connect a call between mobile stations using the general power control method. Referring to FIGS. 1A and 1B, a frame error rate (FER) for a power control frame provided between the mobile station and the base station is conventionally set to a fixed value. The FER is a typical index indicating the call quality of the mobile communication system.

For example, for a call between a mobile station and a wired telephone, if it is assumed that the call quality between mobile station 101 and base station 102 is fixed to x% FER and a call quality between the base station 102 and a wired telephone 103, connected to each other by wire, is zero FER (i.e., no error), then the call quality between the mobile station 101 and the wire telephone 103 is x% FER in FIG. 1A. However, in FIG. 1B, the call quality between mobile station 104 and mobile station 107 becomes 2x% FER, since the call quality between mobile station 104 and base station 105 is x% FER and the call quality between base station 106 and mobile station 107 is also x% FER. Like the wired connection in FIG. 1A, the wired connection between base station 105 and base station 106 has zero FER.

That is, conventionally, power control has been performed using the same target FER regardless of whether the call is between mobile stations or between a mobile station and a wired telephone. Therefore, in a conventional mobile communication system which mainly transmits and receives the voice signals, the call quality is degraded during a call between mobile stations. Furthermore, in a $3^{rd}$ generation mobile communication system which also exchanges image signals, data signals and packet signals, the degradation of call quality on a call between mobile stations will reduce the communication reliability of the image signals and the data signals. In particular, when packet signals are exchanged between the mobile stations, the frequency of retransmission increases undesirably.

SUMMARY OF THE INVENTION

It is, therefore, an object of the present invention to provide a power control device and method for maintaining equivalent or greater call quality for calls between mobile stations as calls between a mobile station and a wired telephone.

It is another object of the present invention to provide a power control device and method for performing different power control according to the type of mobile station in service.

It is further another object of the present invention to provide a power control device and method in which a mobile station performs power control according to a power control parameter corresponding to a call type provided from a base station.

It is yet another object of the present invention to provide a power control device and method in which a mobile station performs power control by reading a power control parameter value corresponding to call type information provided from a base station.

It is still another object of the present invention to provide a power control device and method for performing power control using a different power control parameter value depending on whether there is a normal call request or a high-quality call request by a user of the mobile station.

In accordance with one embodiment of the present invention, there is provided a power control device and method in a mobile communication system. Upon receipt of a call request, a base station selects a call type corresponding to the call request. The base station has a memory for storing power control parameter values for every call type serviceable in the mobile communication system. The base station reads a power control parameter value corresponding to the selected call type from the memory, and provides the read power control parameter value to the mobile station to perform outer loop power control.

In accordance with another embodiment of the present invention, there is provided a power control device and method in a mobile communication system. A mobile station receives a call type from a base station. The mobile station has a memory for storing power control parameter values for every call type serviceable in the mobile communication system. The mobile station reads a power control parameter value corresponding to the received call type from the memory, and performs outer loop power control according to the read power control parameter value.

In accordance with further another embodiment of the present invention, there is provided a power control device and method in a mobile communication system. Upon receipt of a call request from a mobile station, a base station selects a call type corresponding to the call request. The base station has a memory for storing power control parameter values according to call quality and every call type serviceable in the mobile communication system. The base station sets the call quality at a request of the mobile station. Thereafter, the base station reads a power control parameter value corresponding to the selected call type and the set call quality from the memory, and provides the read power control parameter value to the mobile station to perform outer loop power control.

BRIEF DESCRIPTION OF THE DRAWINGS

The above and other objects, features and advantages of the present invention will become more apparent from the following detailed description when taken in conjunction with the accompanying drawings in which:

FIG. 5 is a diagram illustrating an overall format of a service connect message according to an embodiment of the present invention;

FIG. 6 is a diagram illustrating a detailed format of a TYPE_SPECIFIC field shown in FIG. 5;

FIG. 13 is a detailed diagram of the memory shown in FIG. 12;

FIG. 15 is a detailed diagram of the memory shown in FIG. 14.

DETAILED DESCRIPTION OF THE PREFERRED EMBODIMENT

Figure 1A:
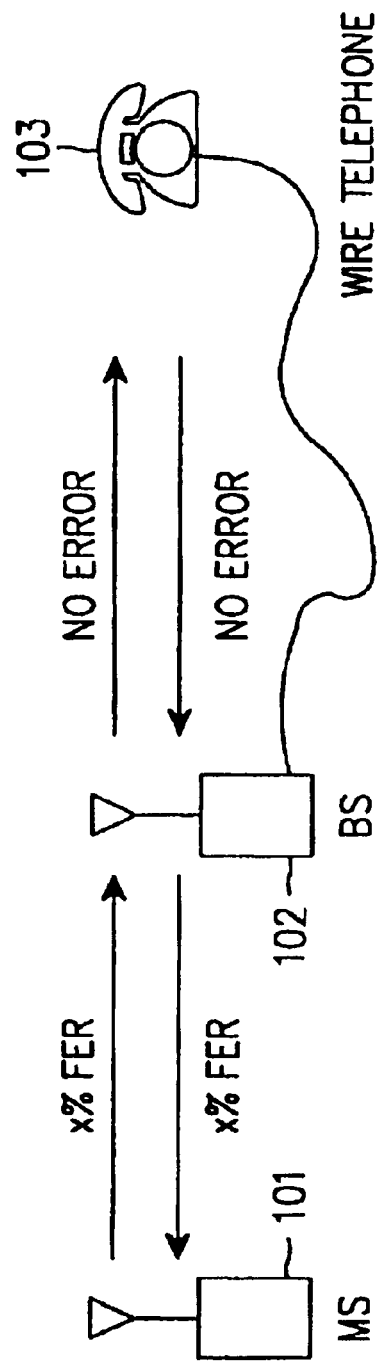
FIG. 1A is a diagram illustrating a call connection between a mobile station and a wired telephone, which uses a general power control method.
Figure 1B:
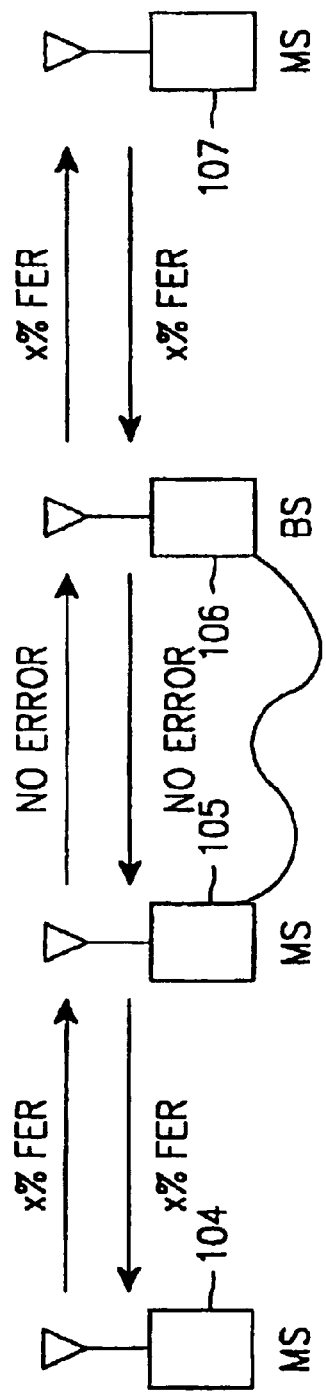
FIG. 1B is a diagram illustrating a call connection between mobile stations, which uses a general power control method.

A preferred embodiment of the present invention will be described herein below with reference to the accompanying drawings. In the following description, well-known functions or constructions are not described in detail since they would obscure the invention in unnecessary detail.

Typically, a mobile communication system adds various performance enhancing devices to a receiver in order to increase a call quality. However, the present invention proposes a method for improving call quality using power control.

Power control performed in a mobile communication system to improve the call quality can be classified into open loop power control, closed loop power control, and outer loop power control.

First, for open loop power control, a mobile station measures the signal-to-noise ratio (SNR) of a transmission signal from a base station, and the base station measures the SNR of a transmission signal from the mobile station, so as to control the strength of a transmission signal to be inversely proportional to the measured SNR.

Second, closed loop power control is used to maintain the SNR of a received signal. To this end, a threshold for power control is first determined. When the SNR of the received signal is higher than the threshold, the base station (or mobile station) commands the mobile station (or base station) to decrease transmission power by a specific level. Otherwise, when the SNR of the received signal is lower than the threshold, the base station (or mobile station) commands the mobile station (or base station) to increase transmission power by a specific level.

Third, for outer loop power control, the FER of a received signal is examined to increase the threshold (power control threshold) required in the closed loop power control by a specific step when errors occur, and to decrease the power control threshold by a specific step when no errors occur. More specifically, to perform outer loop power control, a target FER should be determined and then an increasing level (or step size) and a decreasing level (or step size) of the power control threshold should be determined. For example, if the target FER is 1% and the increasing step size of the power control threshold is 0.5 dB, the decreasing step size of the power control threshold is determined as (0.5/99)dB. After setting the values in this manner, if errors corresponding to the FER occur, the power control threshold will be increased by steps of 0.5 dB, and if no errors occur, the power control threshold will be decreased by steps of (0.5/99)dB. Therefore, it is possible to obtain a target FER by performing outer loop power control. That is, the size of the increasing step of the threshold is previously determined between the base station and the mobile station, and the size of the decreasing step of the threshold is determined, when the target FER is determined, depending on the determined target FER and the increasing level. In addition, in order to prevent the strength of the transmission signal from being infinitely increased or decreased, an upper limit and a lower limit are provided so as not to increase the strength of the transmission signal over the upper limit or decrease the strength below the lower limit.

However, since it is not possible to improve the call quality by simply increasing and decreasing the power control threshold according to outer loop power control, it is necessary to perform outer loop power control together with closed loop power control for transmitting a power control command for increasing or decreasing the transmission power by comparing the threshold determined according to outer loop power control with the SNR of the received signal.

The invention relates to outer loop power control, and performs outer loop power control using a different target FER depending on whether the call occurs between a mobile station and a wired telephone or between mobile stations, thereby maintaining the constant call quality regardless of the call type.

Figure 2A:
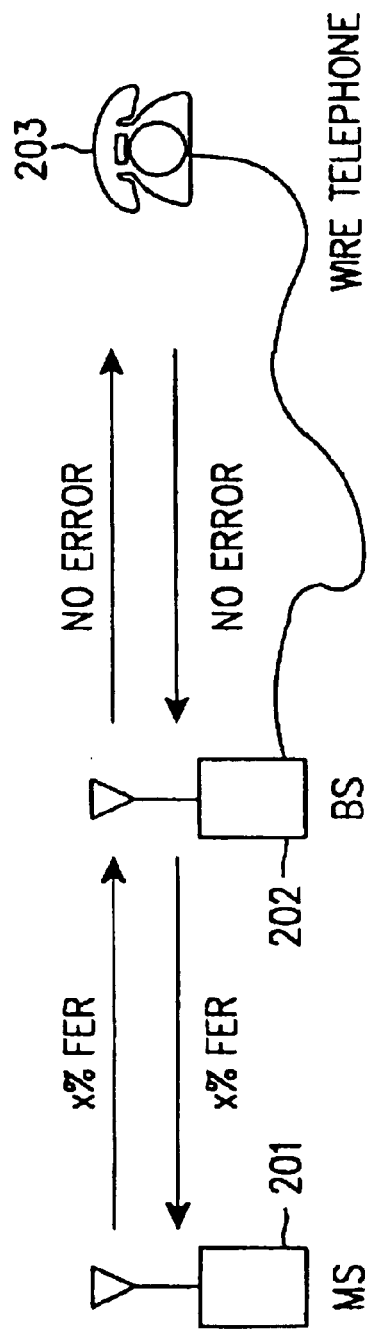
FIG. 2A is a diagram illustrating a call connection between a mobile station and a wire telephone using a power control method according to an embodiment of the present invention.
Figure 2B:
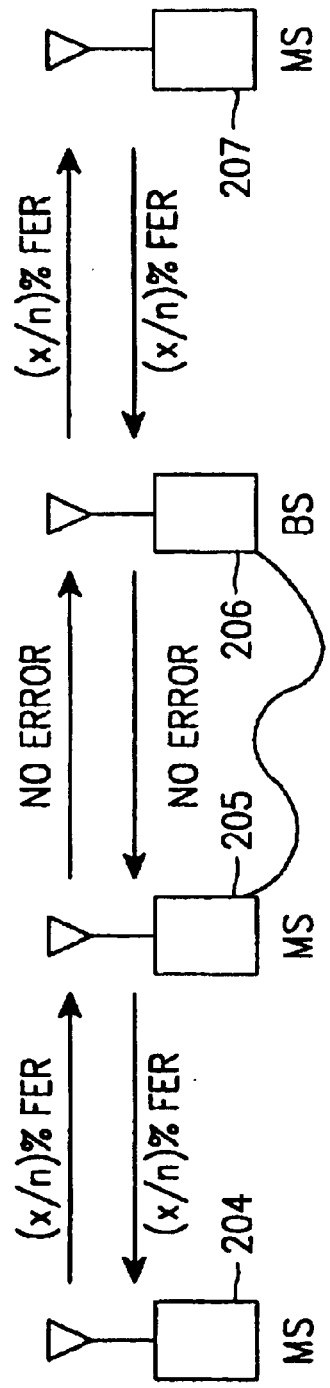
FIG. 2B is a diagram illustrating a call connection between mobile stations using a power control method according to an embodiment of the present invention.

This concept is shown in FIGS. 2A and 2B. FIG. 2A shows how to perform outer loop power control during a call between a mobile station and a wired telephone according to an embodiment of the present invention. FIG. 2B shows how to perform outer loop power control during a call between mobile stations according to an embodiment of the present invention.

Referring to FIGS. 2A and 2B, when a call is connected between a mobile station 201 and a wire telephone 203, the target FER between the mobile station 201 and a base station 202 is set to x%, as in the conventional method. However, when a call occurs between a mobile station 204 and a mobile station 207 as shown in FIG. 2B, the target FER between mobile station 204 and a base station 205 is set to (x/n)% and the target FER between a base station 206 and mobile station 207 is also set to (x/n)%, so that the call quality between the mobile station 204 and the mobile station 207 becomes (2x/n)% target FER.

Herein, 'n' is an integer. When n is large, the call quality between the base station and the mobile station is improved, but the transmission power of the mobile station increases, causing interference to the signals of other users. Because of this, the number of users who can be simultaneously serviced in one cell is decreased, causing a decrease in the overall channel capacity. If n is 2, even a call between mobile stations will have the same call quality as that of a call between a mobile station and a wired telephone. That is, a target FER can be set using the outer loop power control. The target FER is determined depending on a permissible FER of a vocoder in the receiver. In general, since the vocoder in the receiver can accept an FER of 1%, the target FER is normally set to about 1%. In the description below, for a call between mobile stations, the target FER is set to below 0.5% so that even a call between mobile stations may have the same or higher call quality as that of a call between a mobile station and the wired telephone network.

To sum up, in the conventional power control method, for a service option using the same channel, the same power control parameter value is assigned regardless of whether the call occurs between mobile stations or between a mobile station and a wired telephone. However, in an embodiment of the present invention, even for a service option using the same channel, a different power control parameter value is assigned according to whether the call occurs between mobile stations or between a mobile station and a wired telephone, so that even a call between mobile stations may maintain the same or higher call quality as that of a call between a mobile station and a wired telephone.

Three embodiments of the present invention as described below.

In the first embodiment, the base station determines the call type and provides a power control parameter corresponding to the determined call type to the mobile station, and the mobile station then performs outer loop power control using the power control parameter provided by the base station.

In the second embodiment, the mobile station has previously stored power control parameters corresponding to the call types, and performs outer loop power control using a power control parameter corresponding to call type information provided from the base station.

In the third embodiment, unlike the first and second embodiments, when the user requests a high-quality call, the target FER between the mobile station and the base station is newly set and outer loop power control is performed using the newly set target FER. In this embodiment, even for a call between a mobile station and a wired telephone, the base station includes a set of multiple power control parameters and provides them to the mobile station to meet the user's request.

The first embodiment will be described with reference to FIGS. 7 and 8, and the second embodiment will be described with reference to FIGS. 9 and 10.

Meanwhile, to implement the above embodiments of the present invention, it is necessary to define a method for exchanging a message between the base station and the mobile station, and this is performed by a general signal processing procedure for setting up a call between the base station and the mobile station. The messages exchanged between the base station and the mobile station can be divided into messages for transmitting a power control parameter and messages for transmitting the call type. The messages may be slightly different depending on the different embodiments.

Figure 3:
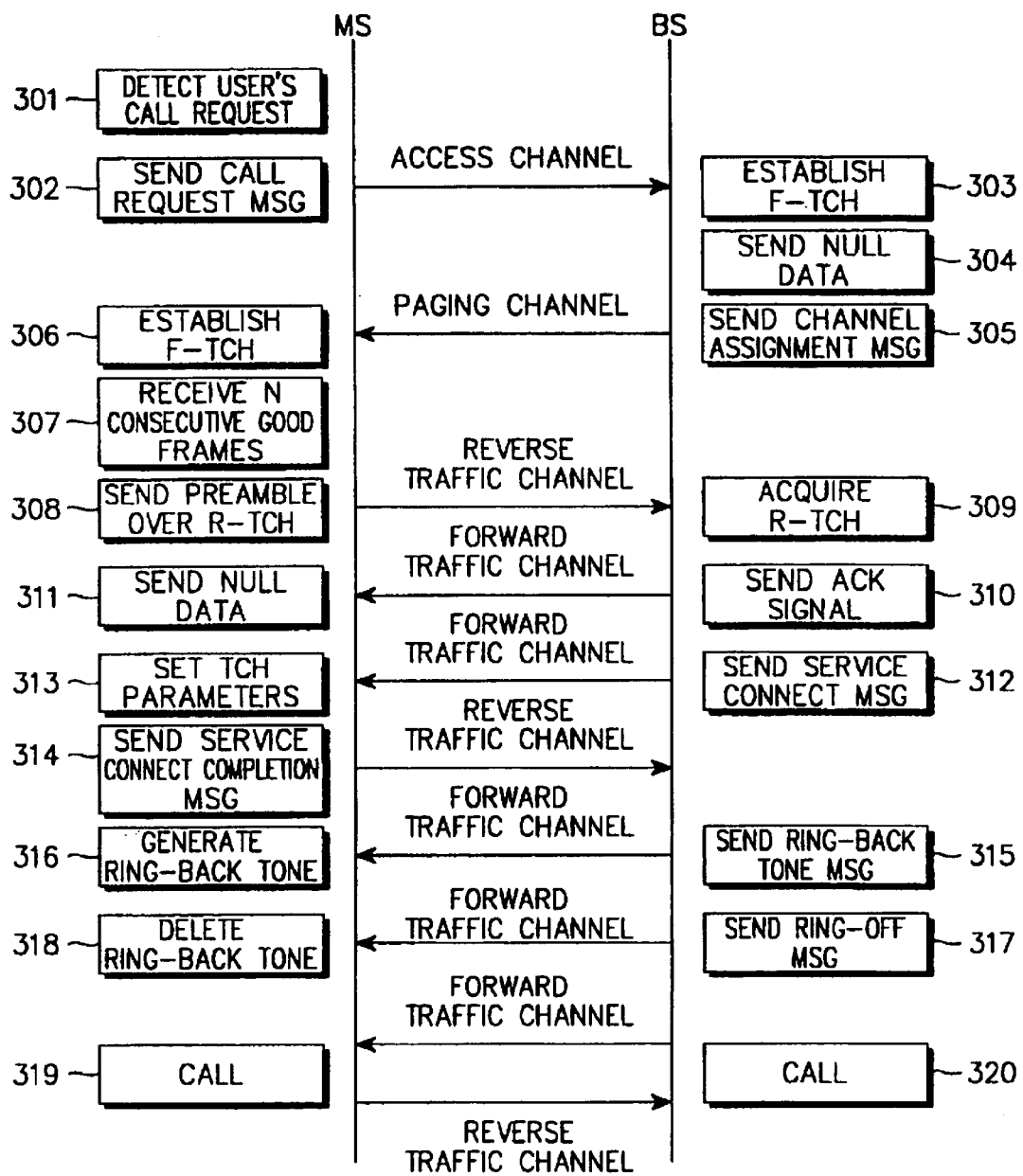
FIG. 3 is a diagram illustrating a signal processing procedure for setting up a call at the call request of a mobile station according to an embodiment of the present invention.
Figure 4:
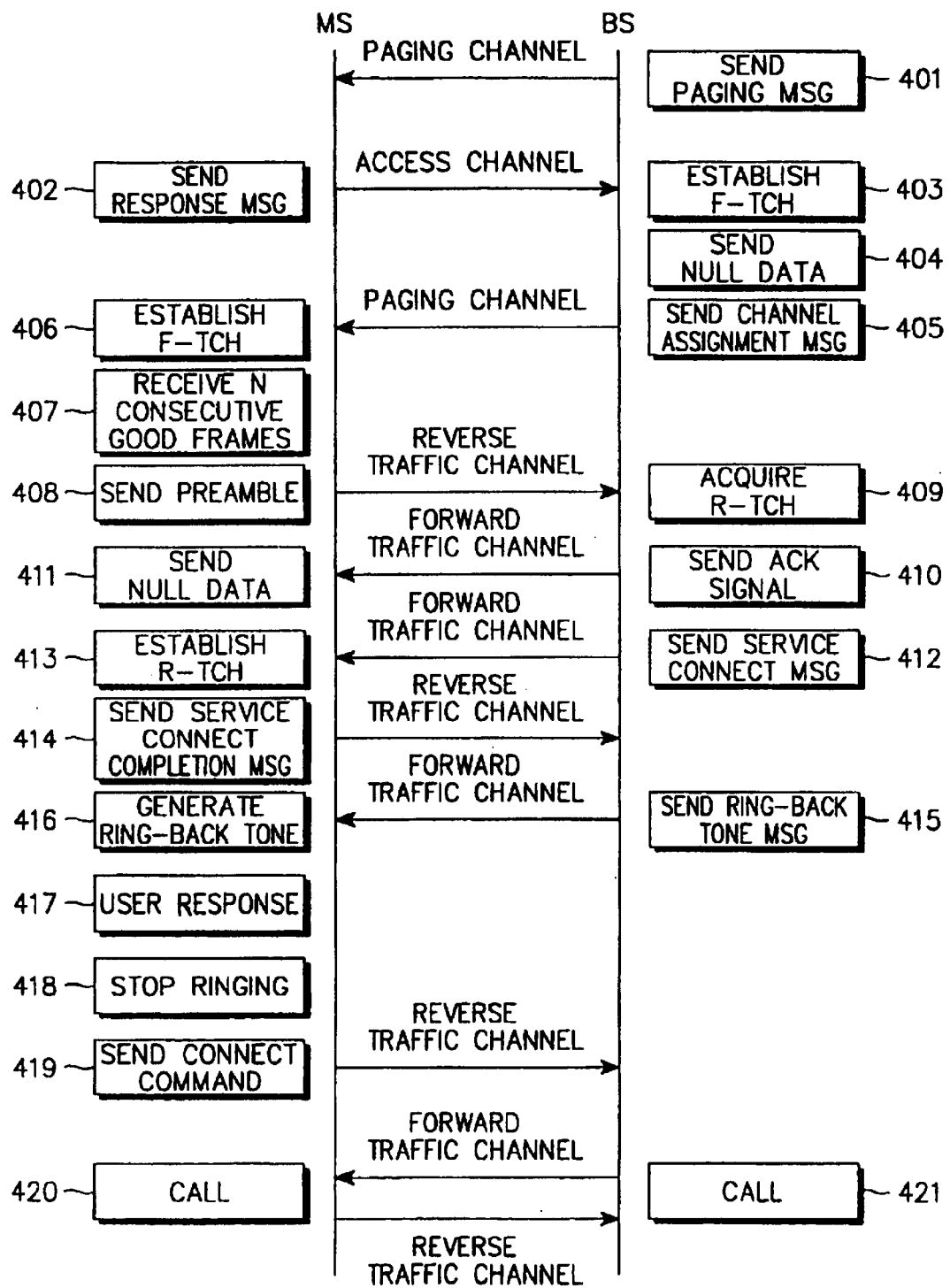
FIG. 4 is a diagram illustrating a signal processing procedure for setting up a call at the call request of a base station according to an embodiment of the present invention.

The general signal processing procedures for setting up a call between the base station and the mobile station are shown in FIGS. 3 and 4.

First, FIG. 3 shows a signal processing procedure in which a call is set up at the call request of the mobile station. Referring to FIG. 3, a description will be made of the procedure for setting up a call at the request of the mobile station. Upon detecting a user's call request signal in step 301, the mobile station transmits a call request message to the base station over an access channel in step 302. The call request message includes a telephone number of the other party to which the call is to be connected. Upon receipt of the call request message over the access channel, the base station searches for the other party using the telephone number included in the call request message and establishes a forward traffic channel (F-TCH) for the call-requesting mobile station, in step 303. When the traffic channel is established, the base station transmits null data over the traffic channel in step 304. The null data refers to predetermined data which has no contents and only informs the mobile station of a call state of the received signal. Further, while transmitting the null data, the base station adds the forward traffic channel establishment information for the call-requesting mobile station to a channel assignment message and transmits the channel assignment message over a paging channel, in step 305. The channel assignment message is filled with information about frame offset, CDMA channel number, pilot PN code offset, code number for the traffic channel, channel condition of the forward link, and channel condition of the reverse link. Upon receipt of the channel assignment message over the paging channel, the mobile station establishes a forward traffic channel according to the channel assignment message in step 306.

When the forward traffic channel is established, the mobile station receives the null data transmitted from the base station over the forward traffic channel, in step 307. If N consecutive frames are free from errors, the mobile station transmits a preamble over a reverse traffic channel (R-TCH) in step 308. The base station receives the signal transmitted from the mobile station over the reverse traffic channel in step 309, and transmits an ACK signal over the forward traffic channel in acknowledgement of the signal in step 310. Upon receipt of the ACK signal from the base station, the mobile station transmits null data over the reverse traffic channel in step 311. If it is determined from the above operation that the forward link and the reverse link have a good channel condition, the base station transmits a service connect message over the forward traffic channel in step 312. The mobile station then sets up traffic channel-related parameters according to the contents of the received service connect message in step 313, and thereafter, transmits a service connect completion message over the reverse traffic channel in step 314. When the service-related setup is completed in steps 312–314, the base station transmits a ring-back tone indicating that the base station is calling the other party, over the forward traffic channel in step 315. Upon receipt of the ring-back tone, the mobile station generates a ring-back tone through an audio path in step 316. At this point, if the other party answers the call, the base station transmits a tone-off message in step 317, and the mobile station then cancels the ring-back tone in response to the ring-off message in step 318. After completing such a process, the mobile station and the base station perform a standard call operation in steps 319 and 320.

In the procedure of FIG. 3, upon receipt of the call request message from the mobile station, the base station searches for a telephone number of the other party to which the mobile station desires to make a call in step 303. At this point, the base station may know whether the other party is a mobile telephone or a wired telephone, depending on the telephone number.

Therefore, in order to apply the novel method of the present invention, such information is applied to the service connect message before transmission. The mobile station then sets the power control parameter by the received service connect message. Here, the information applied to the service connect message may include information about whether the call connection is with a wired telephone, the channel in service, a service option, and the information determined by setting the power control parameters differently according to whether the call occurs between mobile stations or between a mobile station and a wired telephone. That is, the service connect message refers to a message which includes the specific parameters necessary for establishing the traffic channel. This service connect message is shown in FIGS. 5 and 6 by way of example.

Meanwhile, in the existing IS-95A or IS-95B standard, since the base station performs both reverse power control and forward power control, it is not necessary to provide the power control-related parameters to the mobile station. However, in 3rd generation mobile communication systems in which the mobile station performs forward power control, the mobile station should also know the power control-related parameters. Thus, the base station provides the power control-related parameters to the mobile station so that the mobile station may perform power control within a predetermined limit, and requires data for this.

Next, FIG. 4 shows a general signal processing procedure for setting up a call between a mobile station and a base station at the call request of the base station. Referring to FIG. 4, the base station transmits a general paging message to the mobile station over a paging channel in step 401. The mobile station then transmits a response message over an access channel in answer to the paging message in step 402. If it is necessary to connect a traffic channel to the mobile station, the base station establishes a forward traffic channel in step 403, transmits null data over the forward traffic channel in step 404, and then transmits a channel assignment message over the paging channel in step 405. The contents of the channel assignment message are the same as described with reference to FIG. 3. The mobile station establishes the forward traffic channel according to the channel assignment message in step 406. If the null data transmitted from the base station is received without errors for an N-frame period in step 407, the mobile station transmits a preamble over a reverse traffic channel in step 408. The detailed contents of the null data are also the same as described with reference to FIG. 3. When the reverse traffic channel is acquired in step 409, the base station transmits an ACK signal indicating acquisition of the reverse traffic channel in step 410. Upon receipt of the ACK signal, the mobile station transmits null data over the reverse traffic channel in step 411.

If it is determined that the reverse link and the forward link have a good channel condition, the base station transmits a service connect message over the forward traffic channel in step 412. Upon receipt of the service connect message, the mobile station establishes a reverse traffic channel according to the service option in step 413, and transmits a service connect completion message in step 414. When a message indicating assignment of the traffic channel through the service connect message transmitted from the mobile station is received, the base station transmits a ring (or ring-back) tone message indicating that the other party is being called, over the forward traffic channel in step 415. Upon receipt of the message, the mobile station generates a ring (or ring-back) tone to inform the user that the other party is being called, in step 416. If the user of the mobile station answers the ring tone in step 417, the mobile station stops the ring in step 418, and transmits a connect command over the reverse traffic channel in step 419. When such a process is completed, a call connection is maintained between the base station and the mobile station in steps 420 and 421.

In FIG. 4, even though the call requesting user belongs to a different system, it is possible to know the telephone number of the call requesting user. Before assigning the traffic channel to the mobile station, the base station already knows whether the call is between mobile stations or between the mobile station and a wired telephone. Therefore, when transmitting the service connect message, the base station transmits information about the channel in use, the service option, and information about whether the call is between mobile stations or between the mobile station and a wired telephone, or sets up corresponding power control parameters before transmission.

Meanwhile, as mentioned before, the base station and the mobile station should share power control information, and a method for transmitting power control information should be defined.

FIGS. 5 and 6 show a format of the service connect message applied to the embodiments of the present invention. Shown in FIGS. 5 and 6 are the contents (or fields) of the service connect message specified by the North American standard and the bit number assigned thereto. Herein, a description of the service connect message will be limited to only the fields related to the present invention.

FIG. 5 shows the overall format of the service connect message, in which a TYPE_SPECIFIC field 501 relates to the invention. The detailed format of the TYPE-SPECIFIC field 501 is shown in FIG. 6. Referring to FIG. 6, although the TYPE_SPECIFIC field includes data rate, gating rate and power control parameters for the forward and reverse links, the invention uses only the power control parameters 601–608. Thus, a description will be made of the corresponding power control parameters only. A fundamental channel outer loop power control setting field FPC__OLPC__FCH__INCL 601 is a field for setting whether to perform outer loop power control to perform forward power control on the fundamental channel. A fundamental channel target FER setting field FPC__FCH__FER 602 is a field for setting the target FER when outer loop power control is used to perform forward power control on the fundamental channel. A fundamental channel minimum value setting field FPC__MIN__FCH__SETPT 603 is a field for recording the minimum value when outer loop power control is used to perform forward power control on the fundamental channel. A fundamental channel maximum value setting field FPC__MAX__FCH__SETPT 604 is a field for recording the maximum value when outer loop power control is used to perform forward power control on the fundamental channel.

Reference numerals 605–608 denote the fields for setting the outer loop power control-related parameters for the dedicated control channel. More specifically, a dedicated control channel outer loop power control setting field FPC__OLPC__DCCH__INCL 605 is a field for setting whether to use outer loop power control to perform forward power control on the dedicated control channel. A dedicated channel target FER setting field FPC__DCCH__FER 606 is a field for setting the target FER when outer loop power control is used to perform forward power control on the dedicated control channel. A dedicated control channel minimum value setting field FPC__MIN__DCCH__SETPT 607 indicates the minimum value when outer loop power control is used to perform forward power control on the dedicated control channel. A dedicated control channel maximum value setting field FPC__MAX__DCCH__SETPT 608 indicates the maximum value when outer loop power control is used to perform forward power control on the dedicated control channel.

When the service connect message has the format shown in FIGS. 5 and 6, the base station sets FPC__FCH__FER 602 and FPC__DCCH__FER 606 for setting the target FER, according to the call type determined in consideration of the channel in use, the service option, and information about whether the call occurs between mobile stations or the mobile station and a wired telephone. Further, the base station sets differently the FPC__MIN__FCH__SETPT field 603, the FPC__MAX__FCH__SET field 604, the FPC__MIN__DCCH__SETPT field 607, and the FPC__MAX__DCCH__SETPT field 608 for setting the maximum value and the minimum value of the transmission power.

Although the format of the service connect message according to an embodiment of the present invention has been defined, the format of the service connect message according to another embodiment of the present invention can be differently implemented. That is, the base station adds information about a plurality of power control parameters corresponding to the type of the channel in use, the service option, and information about whether the call is between mobile stations or between the mobile station and a wired telephone, which correspond to the parameters 602–604 and 606–608, to the channel assignment message to be transmitted over the paging channel. In addition, the base station provides the service connect message with the parameters 601 and 605 along with a call type message indicating whether the call occurs between mobile stations or between the mobile station and a wired telephone. The mobile station then performs power control by setting the parameters indicated in the message.

As described above, the invention proposes at least three types of embodiments. The first embodiment will be described with reference to FIGS. 7 and 8, and the second embodiment will be described with reference to FIGS. 9 and 10. Further, the third embodiment will be described with reference to FIG. 11. It should be noted that FIGS. 7 to 11 show the minimum procedures for providing examples of the present invention. Further, it should be noted in the description below that the base station and the mobile station belong to the same mobile communication system.

FIRST EMBODIMENT

A detailed description will be made of the first embodiment with reference to FIGS. 7 and 8. In the first embodiment, for power control, the base selects a power control parameter value and provides the selected power control value to the mobile station. To implement this, the base station needs a function for determining the present call type, selecting the corresponding power control parameter value, and providing the selected power control parameter value to the mobile station. The mobile station needs a function for performing outer loop power control according to the power control parameter value provided from the base station. In addition, it is necessary to implement a message for transmitting the power control parameter value and a method for transmitting the same.

Figure 7:
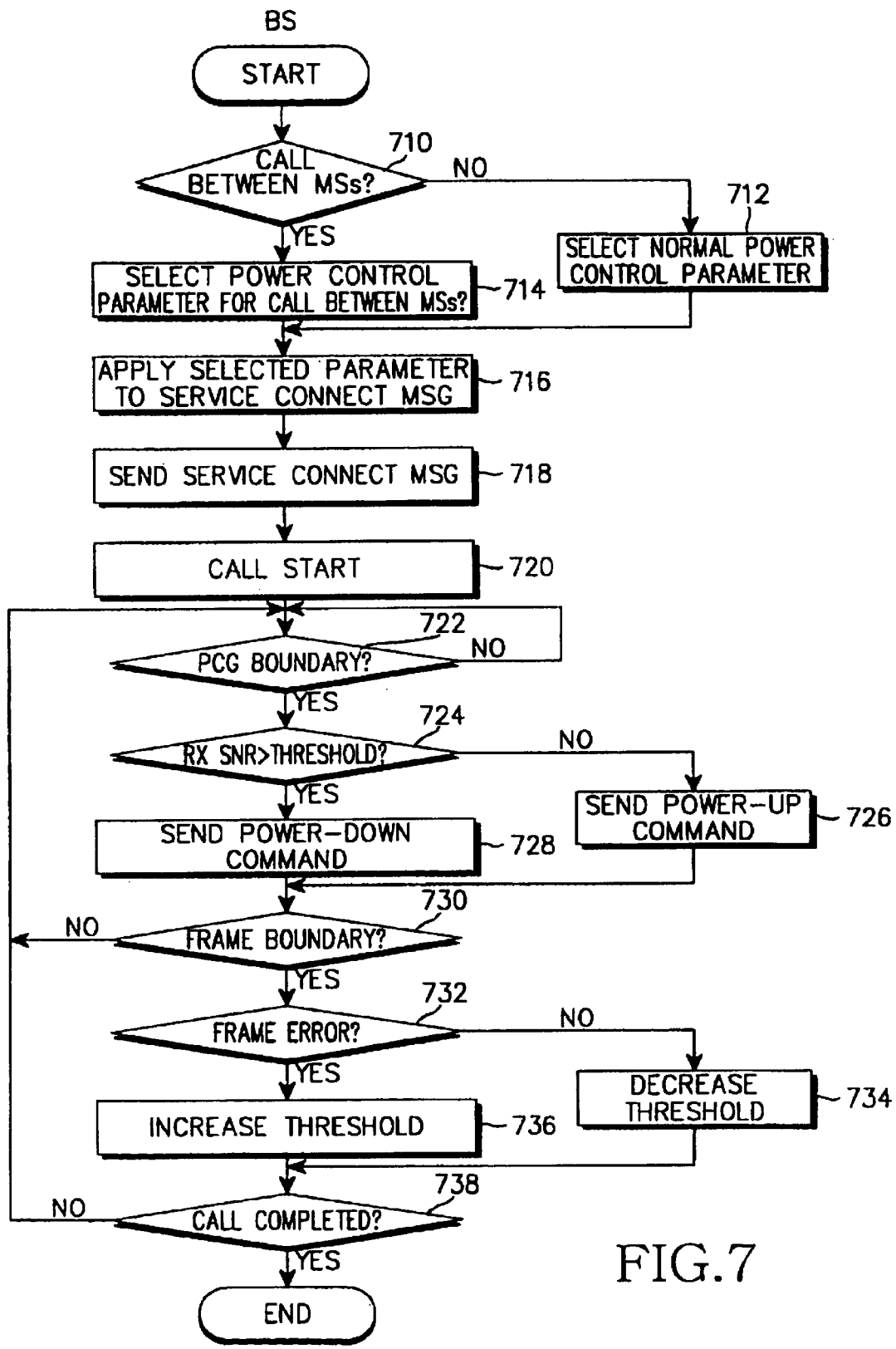
FIG. 7 is a flow chart illustrating a power control procedure performed by a base station according to the first embodiment of the present invention.

FIG. 7 shows a power control procedure performed by a base station according to the first embodiment of the present invention. Referring to FIG. 7, upon receipt of a call request, the base station determines in step 710 whether the call is between mobile stations. Whether a call is between mobile stations is determined based on the call request generated by the user of the mobile station (step 301 of FIG. 3) or the call request provided from a wired telephone. When the call request is generated, the base station determines whether the call request is for a call between mobile stations or for a call between a mobile station and a wired telephone, by analyzing the telephone number of the other party.

If it is determined in step 710 that the call request is for a call between the mobile stations, the base station selects a power control parameter value for a call between mobile stations in step 714. Otherwise, if the call request is for a call between a mobile station and a wired telephone, the base station selects a normal power control parameter value in step 712. The normal power control parameter value refers to a power control parameter value selected by the conventional mobile communication system for outer loop power control. In order to select the power control parameter value according to the call types, an internal memory of the base station separately stores the power control parameters according to the call types. That is, an internal memory of the base station should store separately the power control parameter values for a call between mobile stations and the power control parameter values for a call between a mobile station and a wired telephone. The power control parameters have the formats shown in FIGS. 5 and 6.

After the power control parameter value is selected in step 712 or 714, the base station applies the selected power control parameter value to the service connect message in step 716. As mentioned before, the selected power control parameter value applied to the service connect message may include the channel in use, the service option, and information about whether the call is between mobile stations or between the mobile station and a wired telephone, or include the channel in use, the service option, and information that the power control parameter is differently set according to whether the call is between mobile stations or between the mobile station and a wired telephone. After applying the selected power control parameter value to the service connect message, the base station transmits the service connect message in step 718 (see step 312 of FIG. 3 and step 412 of FIG. 4). After transmission of the service connect message, the base station starts a call in step 720.

After the call is started, the base station examines in step 722 whether it arrives at a boundary of a power control group (PCG) in order to perform power control. The boundary of the power control group means a boundary of a power control group included in one frame. If it is determined in step 722 that it has not arrived at the boundary of the power control group, the base station continues to await the boundary of the power control group. Otherwise, if it is determined that it has arrived at the boundary of the power control group, the base station measures the SNR for a power control group of a received frame and compares the measured SNR with a threshold, in step 724. If it is determined in step 724 that the measured SNR is lower than the threshold, the base station transmits a command to increase transmission power in step 726. Otherwise, if it is determined in step 724 that the measured SNR of the received signal is higher than the threshold, the base station transmits a command to decrease transmission power in step 728.

After transmitting the power control commands in steps 726 or 728, the base station determines in step 730 whether the presently processed signal has arrived at a boundary of the frame. The boundary of the frame means a boundary between the presently received frame and the next frame. Determining whether the signal has arrived at the boundary of the frame is to detect the end of the present frame. If the presently processed signal has not arrived at the boundary of the frame, the base station returns to step 722 to determine again whether it has arrived at the boundary of the power control group. However, if the presently processed signal has arrived at the boundary of the frame in step 730, the base station determines in step 732 whether frame errors have occurred by performing error checking on the frame. If no errors have occurred in step 732, the base station decreases the threshold by a decreasing step of the threshold in step 734.

However, if errors have occurred in step 732, the base station increases the threshold by an increasing step of the threshold in step 736. That is, when errors are detected, the base station increases the threshold by the set increasing step, and when errors are not detected, the base station decreases the threshold by the set decreasing step. For example, if the target FER constituting the power control parameter value is 1% and the threshold increasing level is 0.5 dB, then the threshold decreasing step will be determined as (0.5/99)dB. That is, the threshold increasing step and the threshold decreasing step are determined according to the power control parameter value, which is determined according to the call type (such as a call between mobile stations or a call between the mobile station and a wired telephone), the type of the channel in use, and the service option. After adjusting the threshold in steps 734 or 736, the base station determines in step 738 whether the call is completed. If it is determined in step 738 that the call is completed, the base station ends the call. Otherwise, if the call is not completed, the base station returns to step 722 to determine again whether it has arrived at the boundary of a power control group.

It can be noted from the foregoing description that the process performed in steps 722 to 728 is a process for closed loop power control, and the process performed in steps 730 to 736 is a process for outer loop power control. The increasing step and the decreasing step can be determined using the target FER, which is known when the service connect message is received.

Figure 8:
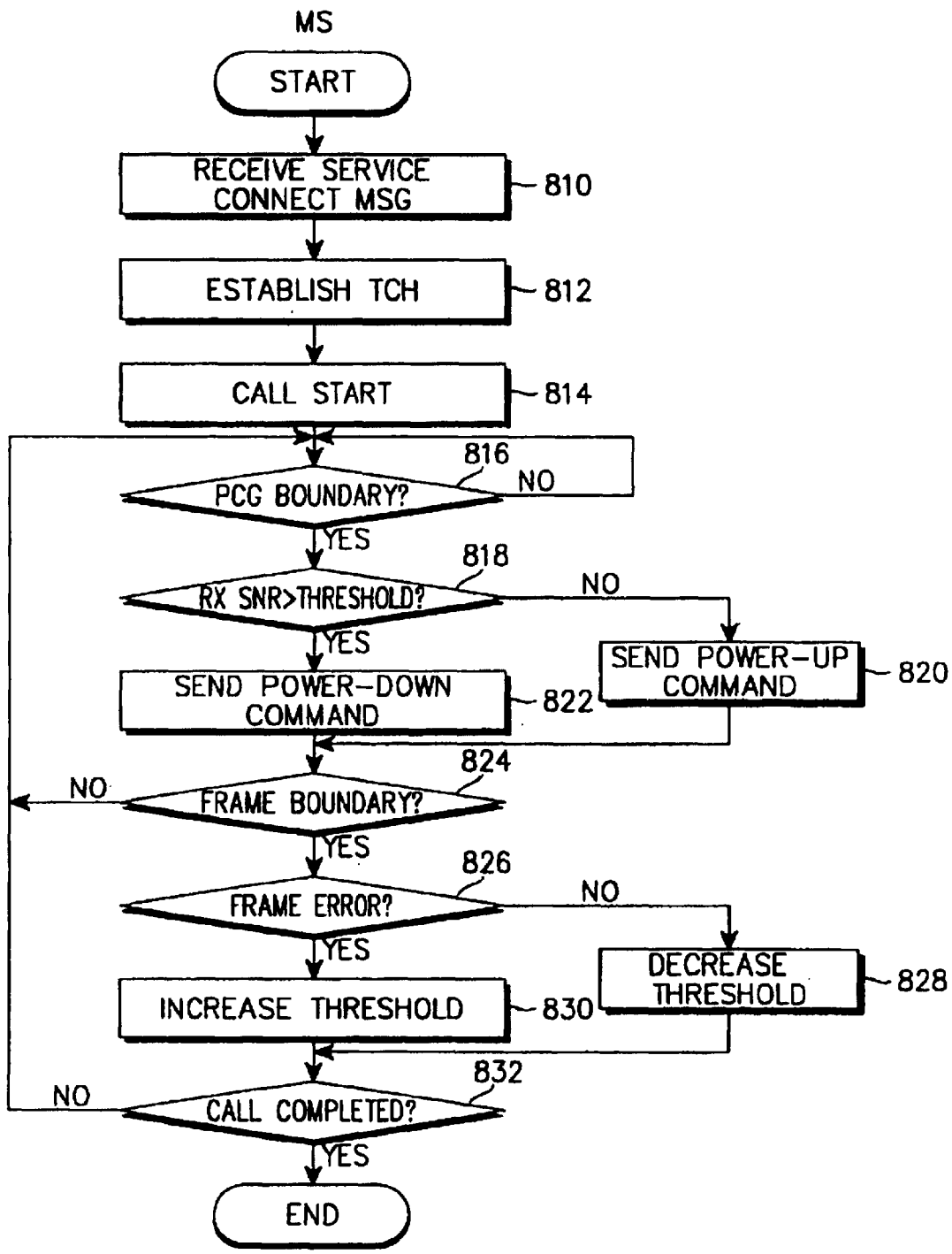
FIG. 8 is a flow chart illustrating a power control procedure performed by a mobile station according to the first embodiment of the present invention.

FIG. 8 shows a power control procedure performed by a mobile station according to the first embodiment of the present invention. Referring to FIG. 8, after performing the call request operation, the mobile station receives the service connect message in step 810. As described with reference to the steps 710 to 718 of FIG. 7, the service connect message is transmitted from the base station and includes the power control parameter. Upon receipt of the service connect message, the mobile station establishes a traffic channel according to the service connect message in step 812, and starts the call with the base station in step 814. Meanwhile, the process performed in steps 816 to 832 after starting the call is identical to the process for performing outer loop power control and closed loop power control, performed in steps 722 to 738 of FIG. 7. That is, this is a combined process of the outer loop power control and the closed loop power control. Of course, at this point, the outer loop power control is performed according to the power control parameter provided through the service connect message. Therefore, a detailed description of steps 816 to 832 is not necessary.

To sum up, in the first embodiment described with reference to FIGS. 7 and 8, the base station transmits a power control parameter to the mobile station. The mobile station receives the transmitted power control parameter and operates accordingly. Therefore, it is possible to use the existing power control method without modification. However, whether to perform the outer loop power control implemented in the embodiment is determined according to information in the service connect message indicating whether the outer loop power control is set up. That is, the outer loop power control can be either performed or not performed according to the information indicating whether the outer loop power control is set up.

The channel assignment message mentioned in FIG. 3 includes only the information necessary for the establishment of the traffic channel. The service connect message refers to the message which includes specific parameters necessary for establishing the traffic channel.

SECOND EMBODIMENT

Figure 9:
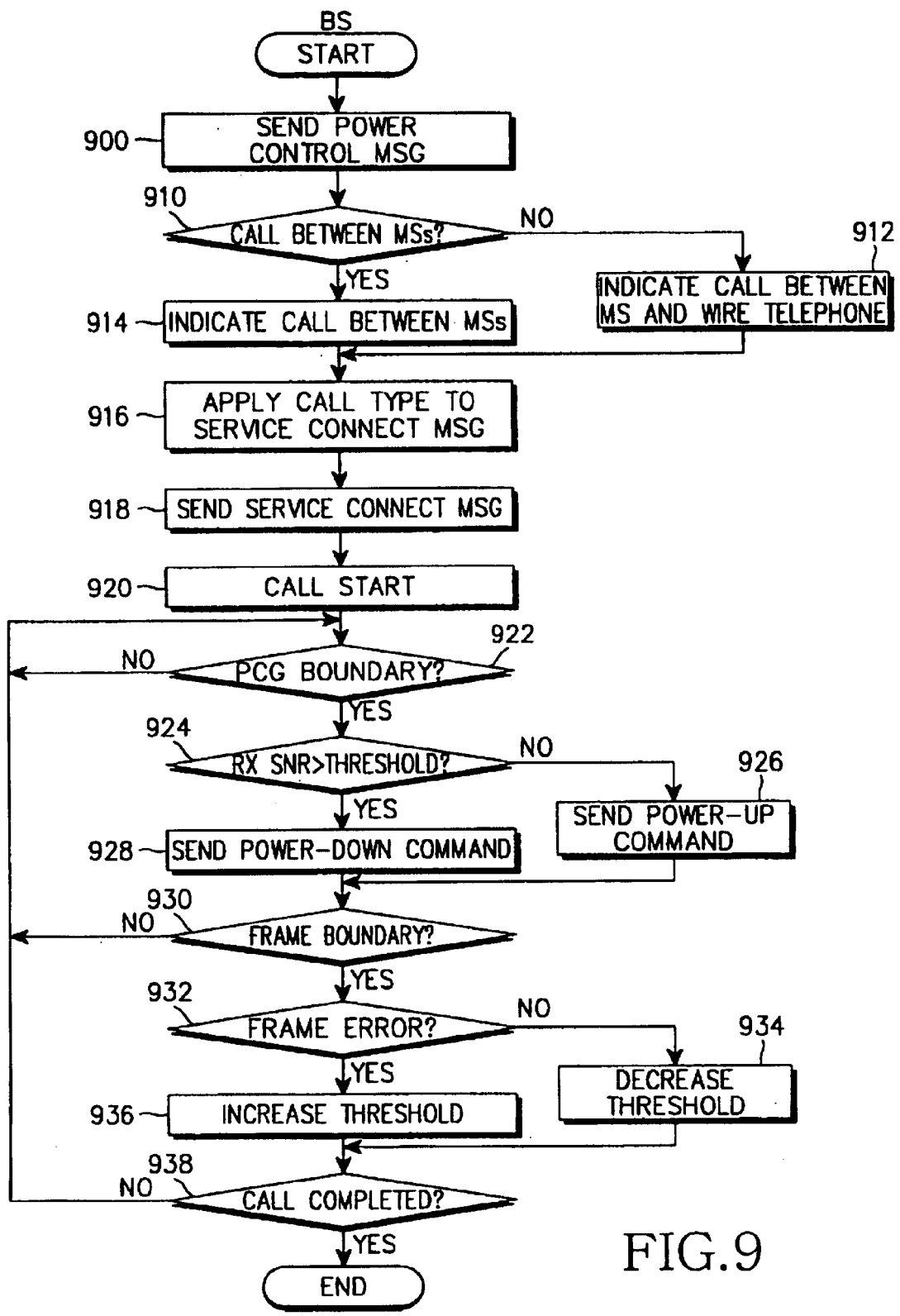
FIG. 9 is a flow chart illustrating a power control procedure performed by a base station according to the second embodiment of the present invention.
Figure 10:
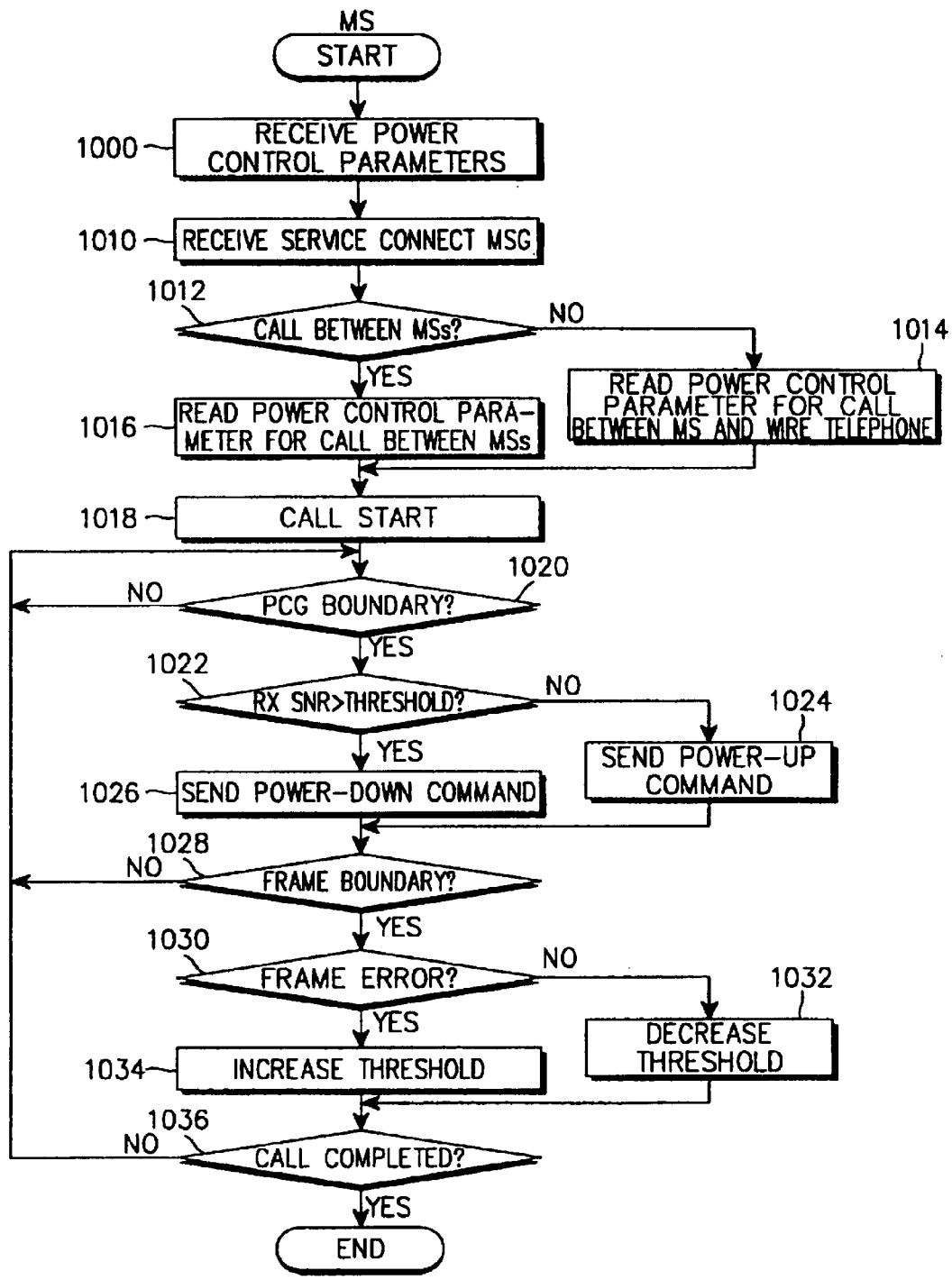
FIG. 10 is a flow chart illustrating a power control procedure performed by a mobile station according to the second embodiment of the present invention.

A detailed description of the second embodiment will now made with reference to FIGS. 9 and 10. In the second embodiment, to perform power control, the base station transmits all the power control parameters to the mobile station before transmission of the service connect message. Alternatively, in a state where the mobile station previously has all the power control parameters, the base station transmits a service connect message informing the mobile station whether the call is between mobile stations or between the mobile station and a wired telephone. The power control parameters can be transmitted using the paging channel or a sync channel. To implement this, the base station has a function of determining the present call type and providing the determined information to the mobile station, and the mobile station has a function of calculating a power control parameter value according to the call type and performing the outer loop power control according to the calculated power control parameter value. To this end, the mobile station includes an internal memory for previously storing the power control parameter values corresponding to the call types. Further, it is necessary to implement a message for providing the call type information and a method for transmitting the message. In addition, it is necessary to implement a method for previously storing the power control parameter values in the internal memory of the mobile station.

FIG. 9 shows a power control procedure performed by the base station according to the second embodiment of the present invention. Referring to FIG. 9, the base station transmits a power control message to the mobile station using the paging channel in step 900. Upon receipt of a call request, the base station determines in step 910 whether the call request is for a call between mobile stations. Here, the power control message refers to a message defined to transmit the power control parameter values corresponding to all the call types serviced by the mobile station. If it is determined in step 910 that the call request is for a call between mobile stations, the base station indicates that the call type is a call between mobile stations, in step 914. Otherwise, if it is determined that the call request is for a call between the mobile station and a wired telephone, the base station indicates in step 912 that the call type is a call between the mobile station and a wired telephone. After indicting the call type in step 912 or 914, the base station applies to the service connect message the call type designating information together with the information for requesting setting up of outer loop power control, in step 916. The call type designating information is added to the service connect message before transmission. For this, the information designating whether the call is between mobile stations or between the mobile station and a wired telephone should be added in place of fields 602, 603, 604, 606, 607 and 608 of FIG. 6 for transmitting the power control parameters.

After applying the information to the service connect message, the base station transmits the service connect message in step 918 (see step 312 of FIG. 3 and step 412 of FIG. 4). After transmitting the service connect message in step 918, the base station starts the call in step 920. The process performed in step 922 to 938 after starting the call is identical to the process performed in steps 722 and 738 of FIG. 7, where outer loop power control and closed loop power control are performed. That is, in this process, the outer loop power control is used in tandem with the closed loop power control. Therefore, a detailed description of steps 922 to 938 will be avoided for simplicity. Of course, at this point, outer loop power control is performed according to the power control parameter corresponding to the resulting determination made in step 910. The power control parameters are stored in the internal memory of the base station.

FIG. 10 shows a power control procedure performed by the mobile station according to the second embodiment of the present invention. Referring to FIG. 10, the mobile station receives all the power control parameters corresponding to the channel in use, the service option and the call type for determining whether the call is between mobile stations or between the mobile station and a wired telephone over the paging channel in step 1000. Thereafter, the mobile station receives the service connect message in step 1010. The service connect message is a service connect message transmitted from the base station in steps 910 to 918 of FIG. 9. This service connect message includes the present call type and the information for determining whether to set up outer loop power control. Upon receipt of the service connect message, the mobile station examines the present call type depending on the call type information included in the service connect message in step 1012. If it is determined in step 1012 that the present call type is a call between mobile stations, the mobile station reads a corresponding power control parameter value stored in the internal memory in step 1016. The read power control parameter is a power control parameter stored for calls between mobile stations. Otherwise, if it is determined in step 1012 that the present call type is a call between a mobile station and a wired telephone, the mobile station reads a corresponding power control parameter value stored in the internal memory in step 1014. The read power control parameter value is a power control parameter stored for calls between the mobile station and a wired telephone. After setting up the power control parameter value, the mobile station establishes a traffic channel to the base station and starts the call in step 1018.

During the call, the mobile station performs, in steps 1020 to 1036, mixed power control using outer loop power control and closed loop power control according to the power control parameter values determined in steps 1014 and 1016. The power control process performed in steps 1020 to 1036 is identical to the power control process performed in steps 722 to 738 of FIG. 7. Therefore, a detailed description will be avoided. In the second embodiment, although the mobile station receives the power control parameter values required for the outer loop power control from the base station, the mobile station may previously store fixed power control parameter values in an internal memory in the case where it is appointed that the mobile station and the base station use the same power control parameter values.

THIRD EMBODIMENT

Figure 11:
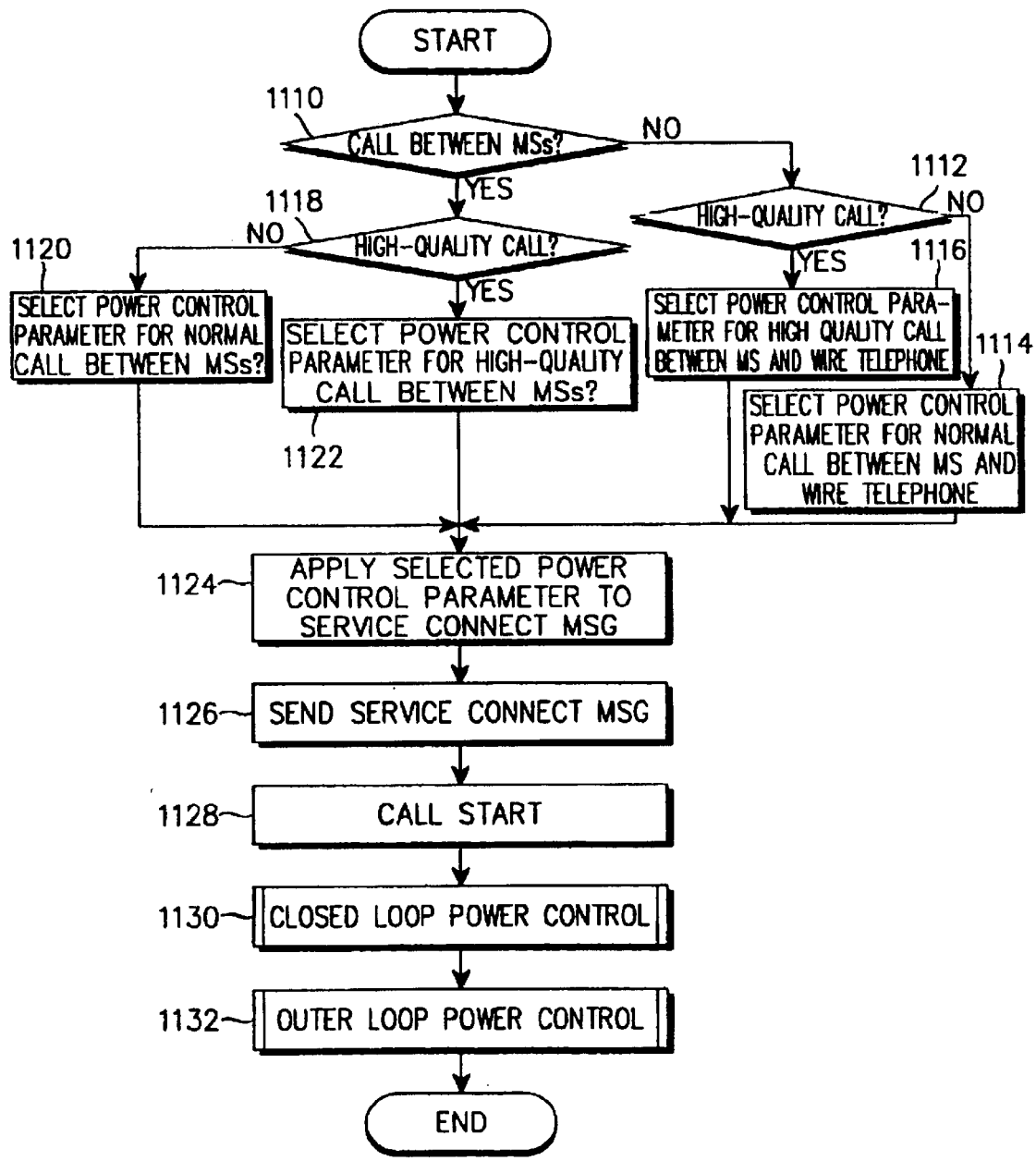
FIG. 11 is a flow chart illustrating a power control procedure performed by a base station according to the third embodiment of the present invention.

FIG. 11 shows a power control procedure performed by the base station according to a third embodiment of the present invention. Referring to FIG. 11, the process for setting the power control parameter is identical to that of the first embodiment. Therefore, although the power control parameter could be set up as in the second embodiment, the description of the third embodiment will be made on the assumption that the power control parameters are transmitted using the method of the first embodiment. In addition, for a high-quality call and a normal call, the internal memory of the base station in the third embodiment separately stores the power control parameter values for a call between mobile stations and power control parameter values for a call between a mobile station and a wired telephone. The normal call refers to a call type described with reference to the first and second embodiments, and the high-quality call refers to a call having an improved call quality as compared with the normal call of the first or second embodiment.

Referring to FIG. 11, after performing a call request operation, the base station determines in step 1110 whether the call is between mobile stations or between a mobile station and a wired telephone. If it is determined that the call is between mobile stations, the base station determines in step 1118 whether a high-quality call is requested or a normal call is requested, by examining whether a high-quality call request is received from the user of the mobile station. The high-quality call request is previously defined as a key code according to a specific key input of the mobile station. If it is determined in step 1118 that a normal call is requested, the base station selects a power control parameter value for a normal call between mobile stations in step 1120. Otherwise, if it is determined in step 1118 that a high-quality call is requested, the base station selects a power control parameter value for a high-quality call between mobile stations in step 1122.

If it is determined in step 1110 that the call occurs between a mobile station and a wired telephone, the base station determines in step 1112 whether a high-quality call is requested or a normal call is requested, by examining whether a high-quality call request is received from the user of the mobile station. If a high-quality call is requested, the base station selects a power control parameter value for a high-quality call between a mobile station and a wired telephone in step 1116. Otherwise, if a normal call is requested, the base station selects a power control parameter value for a normal call between a mobile station and a wired telephone in step 1114.

After selecting the power control parameters in steps 1114, 1116, 1120 or 1122, the base station applies the selected power control parameter value to the service connect message in step 1124. The base station then transmits the service connect message to the mobile station in step 1126. Meanwhile, when the power control parameter value is selected, the base station starts the call in step 1128, and performs closed loop power control and outer loop power control according to the selected power control parameter value in steps 1130 and 1132. Closed loop power control and outer loop power control are performed in the same manner as the first and second embodiments described with reference to FIGS. 7 to 10. Thus, a detailed description will be avoided.

Structure of the Base Station

Figure 12:
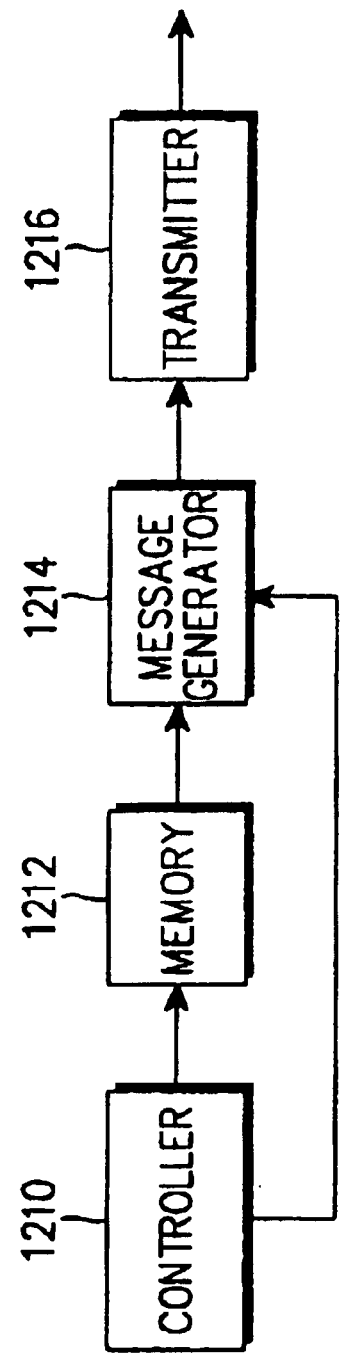
FIG. 12 is a block diagram illustrating a structure of the base station for performing the control procedures of FIGS. 7 and 9.

The base station needs to be modified in order to implement the first to third embodiments. FIG. 12 shows a structure of the base station for implementing the first to third embodiments. FIG. 13 shows a detailed structure of a memory 1212 in FIG. 12. In the first or third embodiment, a controller 1210 of the base station accesses the memory 1212 in which the paging message and the power control parameters are stored in the structure of FIG. 13 when transmitting the service connect message, and reads from the memory 1212 the information about the channel in use, the service option, and the call type for determining whether the call is between mobile stations or between a mobile station and a wired telephone. Further, the controller 1210 generates the service connect message corresponding to the read information using a message generator 1214 and transmits the generated service connect message. In the second embodiment, when transmitting a message to the mobile station over the paging channel, the base station controller 1210 transmits all the power control parameters and the general paging message parameter values, which are stored in the memory 1212 of FIG. 13, over the paging channel, and, when transmitting the service connect message, the base station controller 1210 provides the mobile station with only the information indicating whether the call is between mobile stations or between the mobile station and a wired telephone.

A detailed description will be made of each field of the memory 1212 with reference to FIG. 13. NORM_FPC_FCH_FER_M_L indicates the target FER of a normal forward fundamental channel for the call between the mobile station and a wired telephone. NORM_MIN_FPC_FCH_SETPT_M_L indicates the minimum power of a normal forward fundamental channel for a call between the mobile station and a wired telephone, and NORM_MAX_FPC_FCH_SETPT_M_L indicates the maximum power of a normal forward fundamental channel for a call between the mobile station and a wired telephone. NORM_FPC_FCH_FER_M_M indicates the target FER of a normal forward fundamental channel for a call between mobile stations. NORM_MIN_FPC_FCH_SETPT_M_M indicates the minimum power of a normal forward fundamental channel for a call between mobile stations, and NORM_MAX_FPC_FCH_SETPT_M_M indicates the maximum power of a normal forward fundamental channel for a call between mobile stations. HIGH_FPC_FCH_FER_M_L indicates the target FER of a high-quality forward fundamental channel for a call between the mobile station and a wired telephone.

HIGH_MIN_FPC_FCH_SETPT_M_L indicates the minimum power of a high-quality forward fundamental channel for a call between the mobile station and a wired telephone, and HIGH_MAX_FPC_FCH_SETPT_M_L indicates the maximum power of a high-quality forward fundamental channel for a call between the mobile station and a wired telephone. HIGH_FPC_FCH_FER_M_M indicates the target FER of a high-quality forward fundamental channel for a call between mobile stations. HIGH_MIN_FPC_FCH_SETPT_M_M indicates the minimum power of a high-quality forward fundamental channel for a call between mobile stations, and HIGH_MAX_FPC_FCH_SETPT_M_M indicates the maximum power of the high-quality forward fundamental channel for the call between the mobile stations. Call_Type_Index is used in the second embodiment, but not used in the first embodiment. The Call_Type_Index includes information indicating whether the call is between mobile stations or between the mobile station and a wired telephone.

Structure of the Mobile Station

Figure 14:
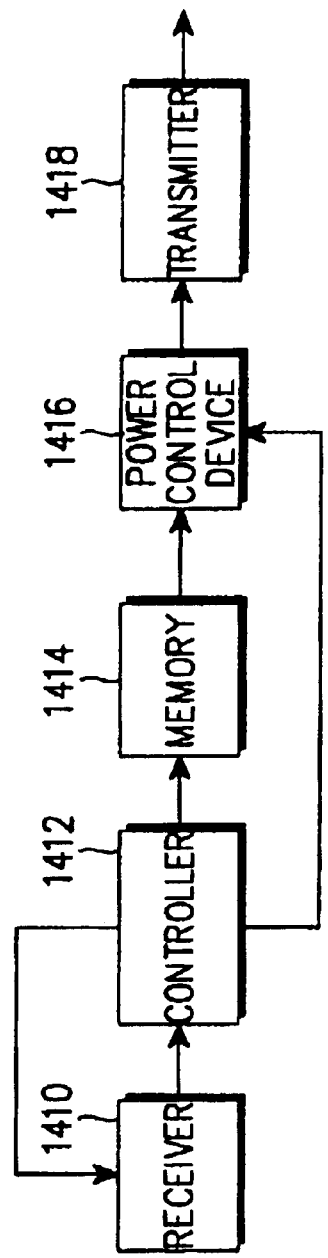
FIG. 14 is a block diagram illustrating a structure of the mobile station for performing the control procedures of FIG. 10.

FIG. 14 shows a structure of the mobile station for implementing the second embodiment. In the first embodiment, the mobile station has the same structure as the conventional mobile station, so a detailed description of that will be avoided. FIG. 15 shows a detailed structure of a memory 1414 in FIG. 14. In the second embodiment, since the base station transmits all the power control parameters to the mobile station over the paging channel, the mobile station stores all the power control parameters in the memory 1414. Further, if the base station transmits a service connect message including a Call_Type_Index indicating whether the call is between mobile stations or between the mobile station and a wired telephone, then the controller 1412 performs power control by transmitting to the power control device 1416 a corresponding power control parameter stored in the memory 1414 according to the call type message, and transmits a generated power control command using a transmitter 1418. Power control device 1416 receives the power control parameter and uses it to perform steps 1020–1036 in FIG. 10.

As described above, when the CDMA mobile communication system performs power control using the conventional method, a call between mobile stations has low call quality compared with a call between a mobile station and a wired telephone. However, in the CDMA mobile communication system to which the novel power control device and method is applied, a call between mobile stations can maintain the same or greater call quality as a call between a mobile station and a wired telephone.

When exchanging only the voice signals, the conventional power control method has no voice degradation problem. In contrast, when image signals or data signals are exchanged between mobile stations, the conventional power control method causes a decrease in the call quality. However, when using the novel power control device and method, even for the service option using the same channel, the traffic channel is established using the different power control parameters according to whether the call is between mobile stations or between a mobile station and a wired telephone, so that a call between mobile stations can maintain an equivalent or greater call quality than a call between a mobile telephone and a wired telephone. In addition, the invention allows the user of the mobile station to select a desired call quality.

While the invention has been shown and described with reference to a certain preferred embodiments thereof, it will be understood by those skilled in the art that various changes in form and details may be made therein without departing from the spirit and scope of the invention as defined by the appended claims. In particular, although the invention has been described with reference to the embodiments applied to the TIA (Telecommunication Industry Association) specifications, it will be understood that the message format should be properly modified when the invention is applied to a W-CDMA (Wideband CDMA) system. For example, although the second embodiment transmits the power control parameter value over the paging channel, a W-CDMA system transmits the message over the forward access channel (FACH).

What is claimed is:

1. A power control method in a mobile communication system, comprising the steps of:

receiving a call request;

selecting a call type corresponding to the call request in a base station having an internal memory for storing power control parameter values for every call type serviceable in the mobile communication system;

reading a power control parameter value corresponding to the selected call type from the memory; and transmitting the read power control parameter value to a mobile station to perform outer loop power control; and performing, in the base station, outer loop power control according to the read power control parameter value;

wherein the call type includes a call between mobile stations and a call between a mobile station and a wired telephone, where a wired telephone is a telephone with a wired connection to a telephone network.

2. The power control method as claimed in claim 1, wherein the call type is selected depending on a telephone number of a called party when a call request message is received from a mobile station, and a telephone number of a calling party when a call request is received from elsewhere.

3. The power control method as claimed in claim 2, wherein the power control parameter value providing step comprises the steps of:

reading, in the base station, a power control parameter value corresponding to a call between mobile stations from the internal memory, when the call type is a call between mobile stations;

reading, in the base station, a power control parameter value corresponding to a call between a mobile station and a wired telephone from the internal memory, when the call type is a call between a mobile station and a wired telephone;

applying, in the base station, the read power control parameter value to a service connect message; and transmitting the service connect message to a mobile station.

4. The power control method as claimed in claim 3, wherein the power control parameter value is comprised of a value for setting whether to perform outer loop power control, a target frame error rate (FER), a minimum value of transmission power, and a maximum value of transmission power.

5. The power control method as claimed in claim 4, further comprising the step of:

performing, in the base station, outer loop power control according to the read power control parameter value.

6. A power control method in a mobile communication system, comprising the steps of:

receiving, in a mobile station, a call type from a base station, said mobile station having a memory for storing power control parameter values for every call type serviceable in the mobile communication system;

reading, in the mobile station, a power control parameter value corresponding to the received call type from the memory; and performing outer loop power control according to the read power control parameter value;

wherein the call type includes a call between mobile stations and a call between a mobile station and a wired telephone.

7. The power control method as claimed in claim 6, further comprising the step of receiving the power control parameter values corresponding to a call type from the base station through a message before establishing a traffic channel to the base station, and storing the received power control parameter value in the internal memory.

8. The power control method as claimed in claim 7, wherein the message is transmitted over a paging channel.

9. The power control method as claimed in claim 7, wherein the message is transmitted over a forward access channel.

10. A power control method in a mobile communication system, comprising the steps of:

receiving a call request from a mobile station;

selecting a call type corresponding to the call request in a base station having a memory for storing power control parameter values according to a call quality and every call type serviceable in the mobile communication system;

setting a call quality according to the call request of the mobile station;

reading a power control parameter value corresponding to the selected call type and the set call quality from the memory;

providing the read power control parameter value to the mobile station to perform outer loop power control; and performing, in the base station, outer loop power control according to the read power control parameter value;

wherein the call type includes a call between mobile stations and a call between a mobile station and a wired telephone, where a wired telephone is a telephone with a wired connection to a telephone network.

11. The power control method as claimed in claim 10, wherein the call type is selected depending on a telephone number of a party to which the mobile station is to be connected.

12. The power control method as claimed in claim 10, wherein the call quality includes a normal call and a high-quality call.

13. The power control method as claimed in claim 10, wherein the power control parameter value is comprised of a value for setting whether to perform outer loop power control, a target Frame Error Rate (FER), a minimum value of transmission power, and a maximum value of transmission power.

14. A power control device for a base station in a mobile communication system, comprising:
- a memory for storing power control parameter values for every call type serviceable in the mobile communication system;
- a controller for reading, upon receipt of a call request, a power control parameter value for a call type corresponding to the call request from the memory; and
- a message generator for applying the power control parameter value to a message under a control of the controller, and for transmitting the message to the mobile station; and
- performing, in the base station, outer loop power control according to the read power control parameter value;
- wherein the call type includes a call between mobile stations and a call between a mobile station and a wired telephone, where a wired telephone is a telephone with a wired connection to a telephone network.

15. The power control device as claimed in claim 14, wherein the power control parameter value is comprised of a value for setting whether to perform outer loop power control, a target Frame Error Rate (FER), a minimum value of transmission power, and a maximum value of transmission power.

16. A power control device for a mobile station in a mobile communication system, comprising:
- a memory for storing power control parameter values for every call type serviceable in the mobile communication system;
- a controller for reading from the memory a power control parameter value corresponding to a call type received from a base station; and
- a power controller for performing outer loop power control according to the read power control parameter value;
- wherein the call type includes a call between mobile stations and a call between a mobile station and a wired telephone, where a wired telephone is a telephone with a wired connection to a telephone network.

17. The power control device as claimed in claim 16, wherein the power control parameter values stored in the memory are received from the base station over a paging channel.

18. The power control device as claimed in claim 17, wherein the power control parameter values stored in the memory are received from the base station over a forward access channel.

* * * * *

UNITED STATES PATENT AND TRADEMARK OFFICE
CERTIFICATE OF CORRECTION

PATENT NO. : 6,757,537 B1
DATED : June 29, 2004
INVENTOR(S) : Jin-Woo Choi et al.

It is certified that error appears in the above-identified patent and that said Letters Patent is hereby corrected as shown below:

Title page,
Item [30], Foreign Application Priority Data, "August 17, 1999" should be -- June 17, 1999 --.

Signed and Sealed this

Third Day of May, 2005

JON W. DUDAS
*Director of the United States Patent and Trademark Office*